(12) United States Patent
Goshey et al.

(10) Patent No.: US 6,327,613 B1
(45) Date of Patent: Dec. 4, 2001

(54) METHOD AND APPARATUS FOR SHARING PERIPHERAL DEVICES OVER A NETWORK

(75) Inventors: Michael Goshey, San Jose; Maureen McMahon, Sunnyvale, both of CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/005,799

(22) Filed: Jan. 12, 1998

(51) Int. Cl.⁷ .................................................. G06F 15/16
(52) U.S. Cl. .................... 709/208; 709/200; 709/202; 709/208; 709/215; 709/219; 709/220; 709/326; 709/327; 707/8; 707/9; 707/10
(58) Field of Search ..................................... 709/200–203, 709/208, 212–213, 216–229, 236–237, 310, 320–321, 326–327; 707/8–10; 713/200–201

(56) References Cited

U.S. PATENT DOCUMENTS

| | | | |
|---|---|---|---|
| 5,237,693 | 8/1993 | Kiyohara et al. | 395/725 |
| 5,317,693 | 5/1994 | Cuenod et al. | 395/275 |
| 5,325,527 * | 6/1994 | Cwikowski et al. | 709/222 |
| 5,548,724 * | 8/1996 | Akizawa et al. | 709/203 |
| 5,598,538 | 1/1997 | Cooper | 395/281 |
| 5,659,794 * | 8/1997 | Caldarale et al. | 709/234 |
| 5,687,320 | 11/1997 | Wiley et al. | 395/200.16 |
| 5,790,809 | 8/1998 | Holmes | 395/200.58 |
| 5,832,298 | 11/1998 | Sanchez et al. | 395/828 |
| 5,862,404 * | 1/1999 | Onaga | 709/223 |
| 5,870,562 | 2/1999 | Butman et al. | 395/200.68 |
| 5,901,286 | 5/1999 | Danknick et al. | 395/200.33 |
| 5,950,203 * | 9/1999 | Stakuis et al. | 707/10 |
| 5,991,829 * | 11/1999 | Giorgio et al. | 709/213 |
| 5,996,024 | 11/1999 | Blumenau | 709/325 |
| 6,003,065 * | 12/1999 | Yan et al. | 709/201 |
| 6,003,133 * | 12/1999 | Moughanni et al. | 713/200 |
| 6,101,555 * | 8/2000 | Goshey et al. | 709/321 |

* cited by examiner

*Primary Examiner*—Zarni Maung
*Assistant Examiner*—Bharat Barot
(74) *Attorney, Agent, or Firm*—Martine & Penilla, LLP

(57) ABSTRACT

Disclosed is a system for transparently sharing peripheral devices over a network. The system includes a first computer having at least one peripheral device, and a second computer that is networked to the first computer. The second computer is configured to send a request to use the at least one peripheral device over the network, and the request is processed to determine whether the second computer has sharing privileges to use the at least one peripheral device. Furthermore, the first computer is configured to grant access to the request of the second computer if the second computer has the sharing privileges that enable access to the at least one peripheral device. In this example, the first computer acts as a Server that can share its peripheral devices, and the second computer acts as a Client that accesses the Server's peripheral devices.

29 Claims, 16 Drawing Sheets

METHOD AND APPARATUS FOR SHARING PERIPHERAL DEVICES OVER A NETWORK

CROSS REFERENCE TO RELATED APPLICATIONS

This application is related to U.S. application Ser. No. 09/005,792, filed on the same day as the instant application, and entitled "Methods and Apparatus for Communicating Between Networked Peripheral Devices." This application is hereby incorporated by reference.

BACKGROUND OF THE INVENTION

1. Field of the Invention

This invention relates generally to computer peripheral devices, and more particularly to methods and apparatus for sharing peripheral devices connected to one networked computer with other networked computers.

2. Description of the Related Art

Recently, computer users have enjoyed substantial flexibility in the way their computers are equipped. This flexibility is primarily due to the increased use of peripheral devices, which allow computer users to purchase only those hardware devices that make sense for their particular work requirements. In fact, the variety of available peripheral devices is ever increasing, which necessarily requires that they be well integrated with the computer's existing software. Although most peripheral device manufacturers are able to provide excellent software drivers that enable the full functionality of the peripheral devices when they are connected to a local computer, other networked computers are not always able to fully access or utilize the peripheral devices connected to other computers on a shared network.

FIG. 1 is a network diagram 10 having a number of computers 12a through 12d coupled together via a file server 14. In this configuration, each of the computers may communicate with each other, as well as share and use information stored on the file server 14. Conventionally, each of the computers may have a host adapter that enables the computer to connect up to external peripheral devices. As shown, computer 12a has a host adapter 16a which is used to connect up to peripheral devices, such as a hard drive 22, and a JAZ™ drive 24. Generally, the host adapter 16a is in the form of an adapter card (or PCMCIA card for portable computers) that connects to the computer 12a via a PCI bus or the like.

Similarly, computer 12b has a host adapter 16b which enables computer 12b to communicate to a scanner 18 and an optical drive 20. Although these peripheral devices enable computers 12a and 12b to have extended use and functionality, these peripheral devices are generally not fully accessible to other computers that are connected to the network over the file server 14. For example, even though computers 12c and 12d may conventionally acquire some rudimentary read and write privileges to peripheral devices 20, 22, and 24, they are still not able to issue full standard SCSI commands to those peripheral devices.

Furthermore, neither computer 12a, 12c, nor 12d may gain access or functional use of the scanner 18 that is connected to the computer 12b. This is generally the case because many peripheral devices are not assigned drive letters during boot-up. Such devices generally include scanners, tape drives, CD-R drives, and other SCSI based peripheral devices. As a result, those peripheral devices may not be fully shared over a network of computers, which may necessitate the purchase of a redundant peripheral device (i.e., a scanner) for each local computer system.

Unfortunately, this will drive up the cost of a given network, and may be unsuitable for smaller businesses or home offices where low cost networking solutions are most needed. To partially alleviate this problem, some computer peripheral companies have introduced a solution that enables sharing of such peripheral devices over a network when additional custom hardware circuitry and software is provided. For example, Hewlett-Packard of Palo Alto, Calif., has a hardware solution that requires users to purchase a network box 26 having special hardware to assist in communicating with a host adapter 16c. The network box 26 is then connected to a scanner 28 that is custom designed to interface with a network box 26. In some cases, the network box 26 circuitry may be integrated directly into the scanner 28.

Once the scanner 28 has been connected to the file server 14 via the host adapter 16c, the scanner 28 may be shared by other computers that are networked through the file server 14. Although this sharing solution works well in some high-end networks, the cost of sharing peripheral devices, such as scanner 28 over a network may be prohibitively expensive compared to the cost of a conventional peripheral device. Consequently, the scanner 28 and network box 26 solution may not be cost effective for use in smaller networked arrangements or home office use.

In view of the foregoing, there is a need for a method and apparatus that enables networked computers to access peripheral devices that are connected to any one of the respective network computers, without the need for expensive interfacing hardware or custom peripheral devices.

SUMMARY OF THE INVENTION

Broadly speaking, the present invention fills these needs by providing a method and apparatus for efficiently communicating and sharing peripheral devices that may be connected to a computer that is networked with other computers that may desire the use of the networked peripheral devices. It should be appreciated that the present invention can be implemented in numerous ways, including as a process, an apparatus, a system, a device, a method, or a computer readable medium. Several inventive embodiments of the present invention are described below.

In one embodiment, a system for sharing peripheral devices over a network is disclosed. The system includes a first computer having at least one peripheral device, and a second computer that is networked to the first computer. The second computer is configured to send a request to use the at least one peripheral device over the network, and the request is processed to determine whether the second computer has sharing privileges to use the at least one peripheral device. Furthermore, the first computer is configured to grant access to the request of the second computer if the second computer has the sharing privileges that enable access to the at least one peripheral device. In this embodiment, the first computer acts as a Server that can share its peripheral devices, and the second computer acts as a Client that access the Server's peripheral devices.

In another embodiment, a method for sharing peripheral devices over a network is disclosed. The network has a first computer that includes a first host adapter and a first SCSI peripheral device that is connected to the first host adapter. The method includes receiving a request to use the first SCSI peripheral device from a second computer that is connected to the network, and determining whether the second computer has access privileges to use the first SCSI peripheral device. The method further includes connecting the second computer to the first SCSI peripheral device if the second computer has access privileges to use the first SCSI peripheral device. Preferably, the method also includes determining whether a third computer is currently reserved to use the first SCSI peripheral device, and when the third computer is currently reserved to use the first SCSI peripheral device, the request to use the first SCSI peripheral device is placed in a queue.

In yet a further embodiment, an apparatus for sharing peripheral devices over a network that includes a first computer that has a first SCSI peripheral device is disclosed. The apparatus includes means for receiving a request to use the first SCSI peripheral device from a second computer that is connected to the network. The apparatus also includes means for determining whether the second computer has access privileges to use the first SCSI peripheral device. The apparatus further includes means for connecting the second computer to the first SCSI peripheral device if the second computer has access privileges to use the first SCSI peripheral device. In this embodiment, the first computer acts as a server that can share the first SCSI peripheral device with the second computer that acts as a client.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a method and apparatus for efficiently communicating and sharing peripheral devices that may be connected to a computer that is networked with other computers. It will be obvious, however, to one skilled in the art, that the present invention may be practiced without some or all of these specific details. In other instances, well known process operations have not been described in detail in order not to unnecessarily obscure the present invention.

Figure 1:
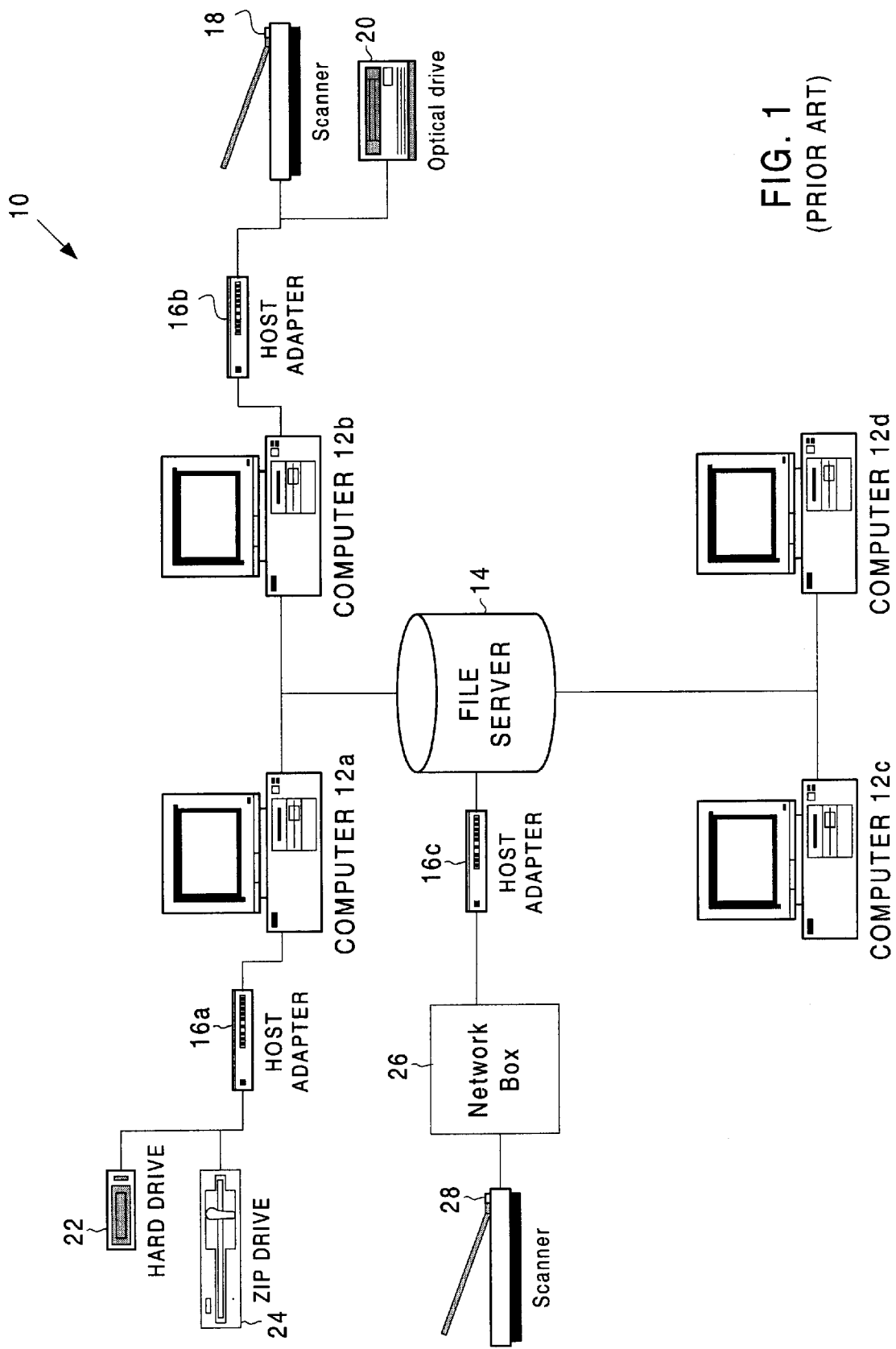
FIG. 1 is a network diagram that has a number of computers networked together.
Figure 2A:
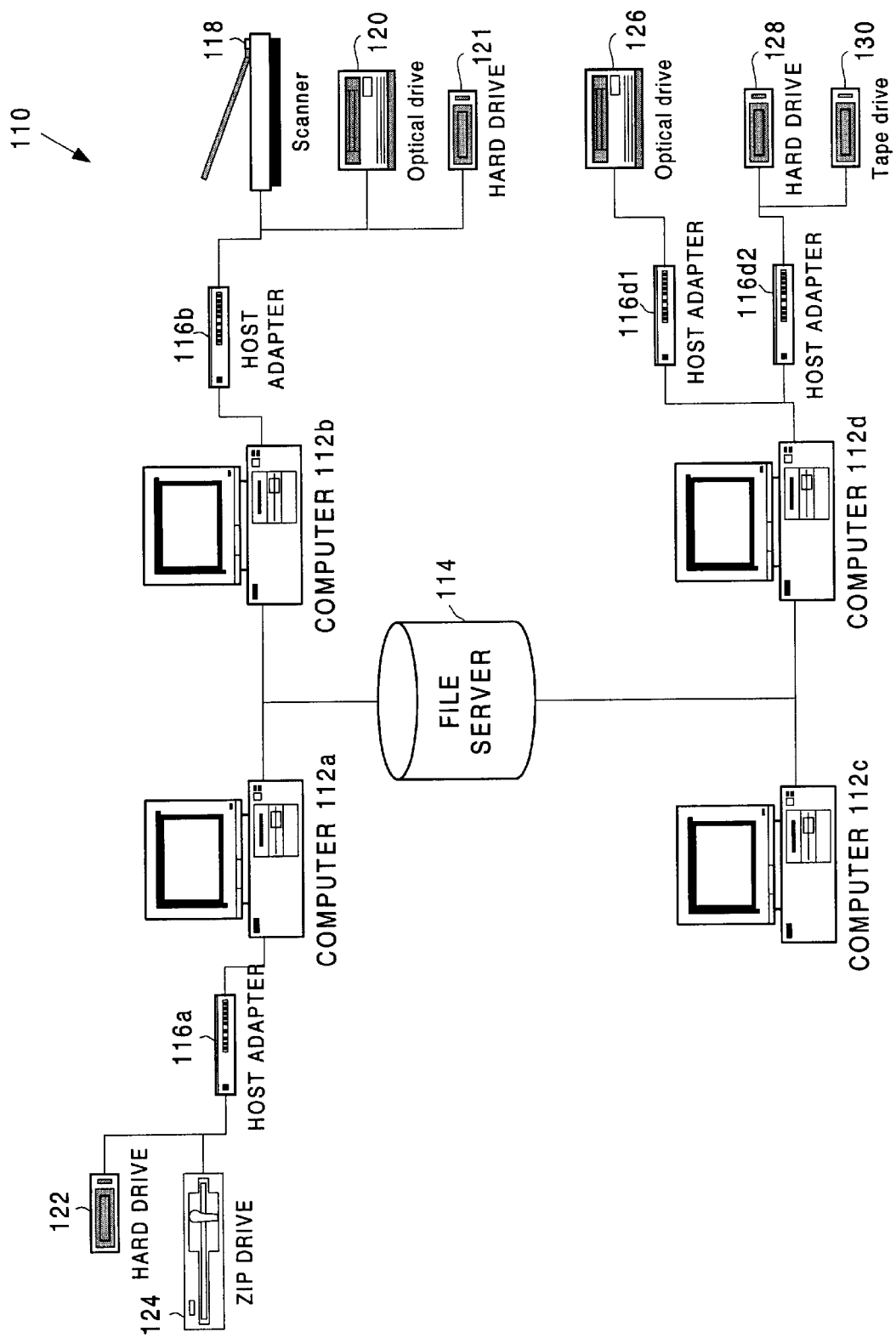
FIG. 2A shows a network diagram in accordance with one embodiment of the present invention.

FIG. 2A shows a network diagram 110 in accordance with one embodiment of the present invention. In this example, computers 112a through 112d are networked via a file server 114. In addition, several of the computers have host adapters 116 which enable interconnection to external peripheral devices. As shown, computer 112a is connected to a hard drive 122 and a JAZ™ drive 124 via a host adapter 116a. Computer 112b is connected to a scanner 118, an optical drive 120, and a hard drive 121 via a host adapter 116b. Computer 112d is connected to an optical drive 126 via a host adapter 116d1, and a hard drive 128, and a tape drive 130 via a host adapter 116d2.

In this example, computer 112c is not shown having an adapter for interconnecting external peripheral devices. In one embodiment, when a user of computer 112d wishes to verify which external peripheral devices it has access to, the user may perform a scan of host adapters and peripheral devices using a SCSI Explorer program, that is available from Adaptec, Inc. of Milpitas, Calif.

Figure 2B:
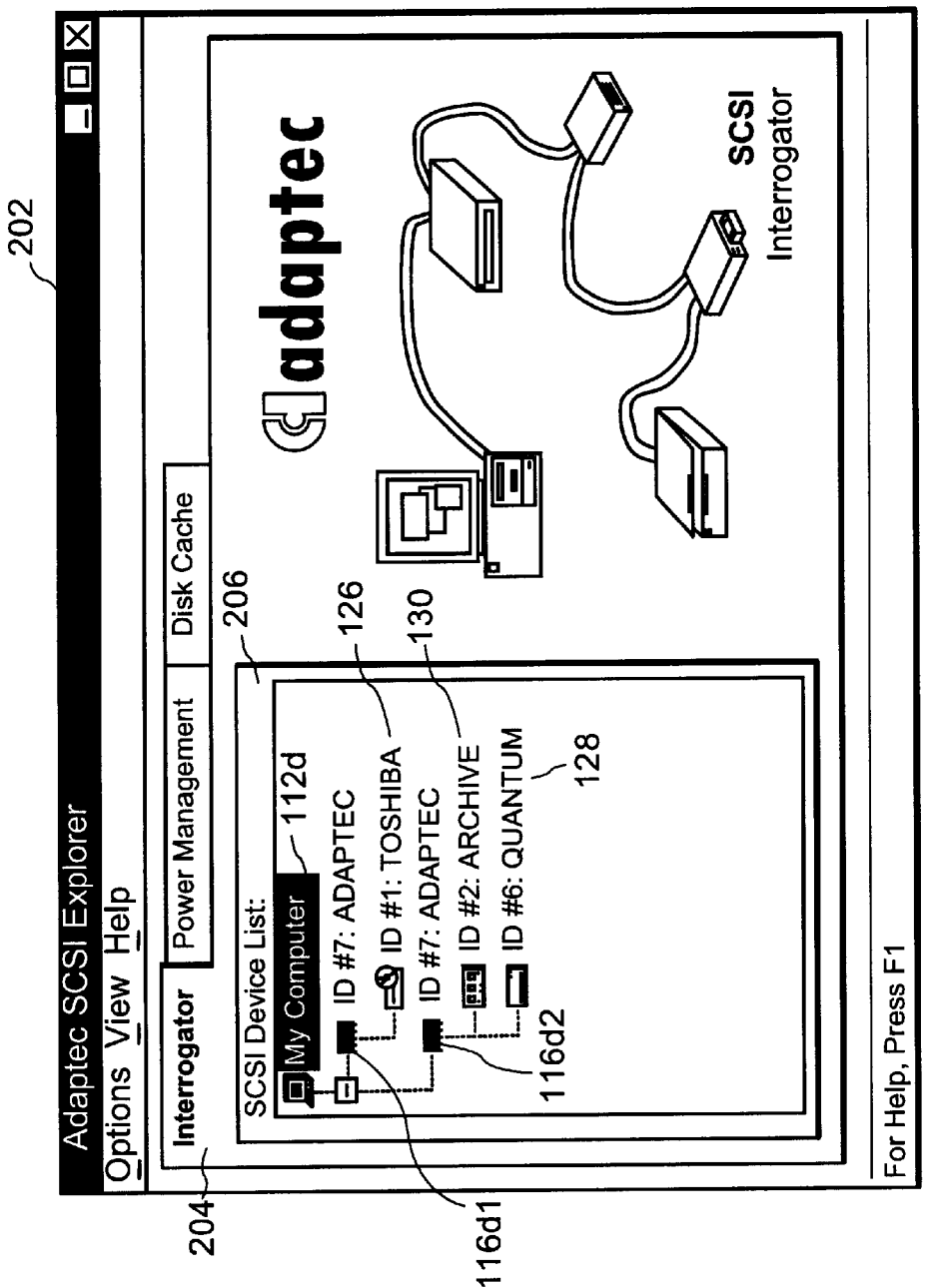
FIG. 2B shows a SCSI Explorer™ window that has an interrogator option in accordance with one embodiment of the present invention.

FIG. 2B shows a SCSI Explorer™ Window 202 that has an interrogator 204 option. When the interrogator 204 option is run, a list of available devices that are actually connected to computer 112d are shown in a window 206. Specifically, a SCSI device list in tree format is displayed identifying any devices that are accessible and connected to computer 112d of FIG. 2A. In this example, computer 112d is shown having a host adapter 116d1 and a host adapter 116d2, which respectively have the peripheral devices illustrated in FIG. 2A.

As shown, the SCSI Explorer™ Window 202 is not able to see or access any of the peripheral devices that are connected to the other computers that are networked via the file server 114 of FIG. 2A. Consequently, the user of computer 112d may not have full SCSI command access to the peripheral devices of either computer 112a or computer 112b. In one embodiment of the present invention, when a Server/Client (S/C) ScanLAN code is loaded onto any one of the computers that are networked in FIG. 2A, the code will enable a user of any one of those computers to see and access via full SCSI commands, peripheral devices on other computers. However, the access level may be restricted based on custom privilege settings, which will be described in greater detail below.

Figure 2C:
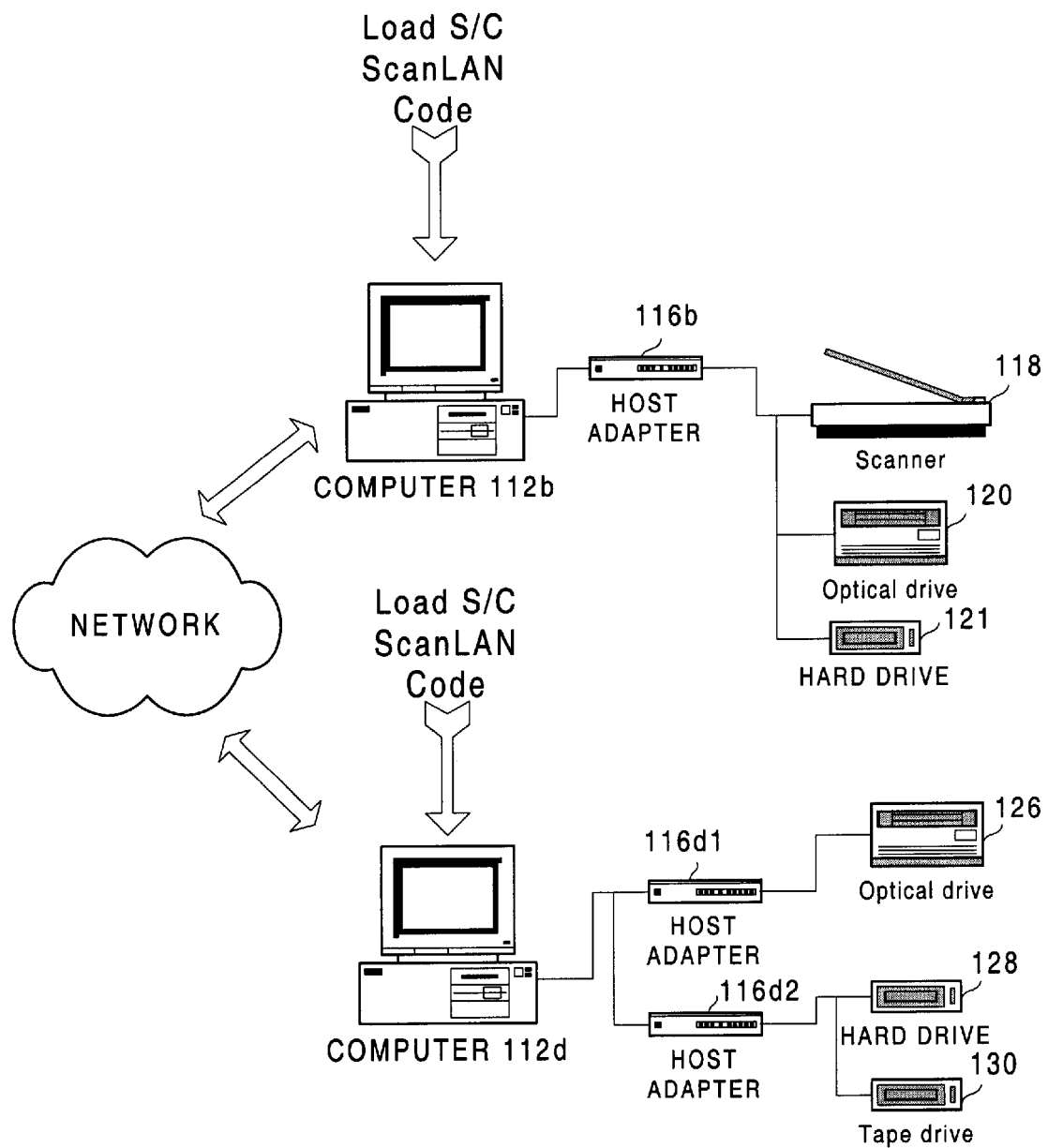
FIG. 2C shows a partial diagram of FIG. 2A, in which a Server/Client ScanLAN code is loaded onto computers in accordance with one embodiment of the present invention.

FIG. 2C shows a partial diagram of FIG. 2A in which the S/C ScanLAN code is loaded onto computer 112b and computer 112d in accordance with one embodiment of the present invention. In this embodiment, computers 112b and 112d may be any computer that is connected to a network (local area network, wide area network or Internet). In addition, the S/C ScanLAN code may be manually loaded onto each computer from a computer readable medium (i.e., diskettes, CD ROM, etc.) or remotely loaded onto selected computers over an administration network computer. Once the S/C ScanLAN code has been loaded onto individual computers, users of a selected networked computer will then be able to access the peripheral devices connected to other network computers as if the peripheral devices were connected to their local computer. As mentioned above, the access to selected peripheral devices of a given network may be custom modified to grant or deny use privileges.

By way of example, if the Server (S) ScanLAN code is loaded onto computer 112b, and the Client (C) ScanLAN code is loaded onto computer 112d, then the user of computer 112d may be granted access privileges to the peripheral devices connected to computer 112b (which runs as a Server). Alternatively, each one of computers 112b and 112d may be loaded with both the Server and the Client ScanLAN code, which will therefore enable other users connected to the network to access the peripheral devices connected to both computer 112b and computer 112d, when they are running as a Server.

A particular advantage of the present invention is that no additional hardware is needed to enable a user of a local computer to fully access the peripheral devices connected to other computers connected to the network. In fact, a user of a local computer may issue SCSI commands to networked peripheral devices that would normally only work for peripheral devices that were connected to the local computer. As such, the user may now access devices, such as scanners, tape drives, CD-R drives, and other SCSI devices that are typically not assigned a drive letter, without the need for expensive hardware or expensive custom peripheral devices.

Figure 2D:
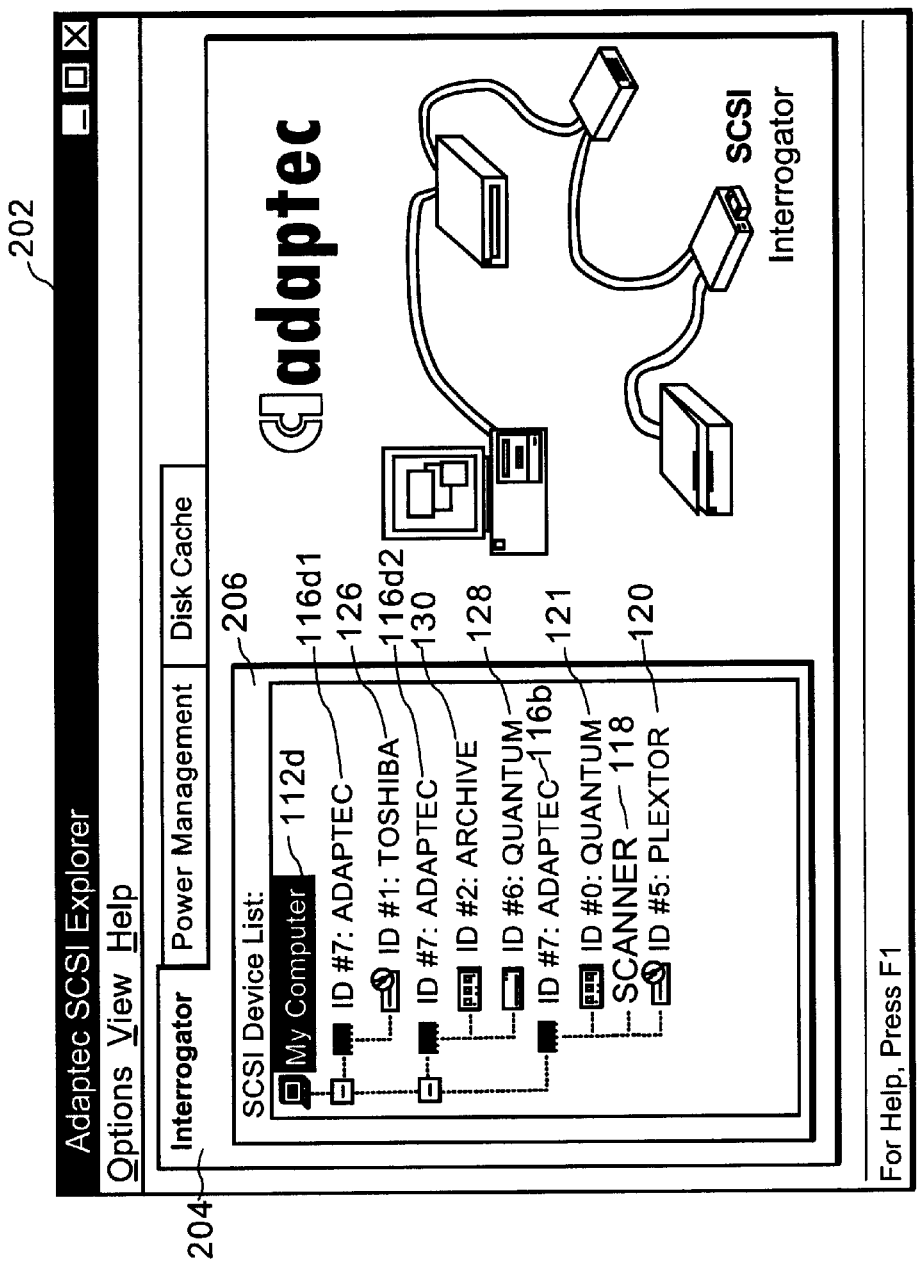
FIG. 2D shows the SCSI Explorer™ window after the ScanLAN code has been loaded onto some of the computers of FIG. 2A in accordance with one embodiment of the present invention.

FIG. 2D shows the SCSI Explorer™ Window 202 after the ScanLAN code has been loaded onto at least computers 112b and 112d of FIG. 2C in accordance with one embodiment of the present invention. As shown, the SCSI device list 206 is now expanded to include host adapter 116b (and peripheral devices 118, 120 and 121), which is physically connected to the computer 112b. Accordingly, when a user of the computer 112d uses the interrogator 204 to determine what peripheral devices and host adapters are connected to computer 112d, the SCSI device list 206 will also include the peripheral devices that are connected to computer 112b, as if they were physically connected to computer 112d. Advantageously, the user of computer 112d may now access and issue SCSI commands to those peripheral devices that are connected to the host adapter 112b as if they were connected to computer 112d.

In one embodiment, any computer that is running either the Server or the Client ScanLAN code, will also implement a modified Dynamically Linked Library (DLL). This modified DLL will therefore enable connection to remote host adapters when an Adaptec, Inc. WNASPI32.DLL (which ships with Microsoft's operating systems) sends requests to use devices over a network. For more information on the functionality of the modified DLL, reference may be made to a commonly assigned U.S. patent application Ser. No. 09/005,792, and entitled "Methods and Apparatus for Communicating Between Networked Peripheral Devices" now U.S. Pat. No. 6,101,555. This application was filed on the same day as the instant application, and is hereby incorporated by reference.

Figure 3A:
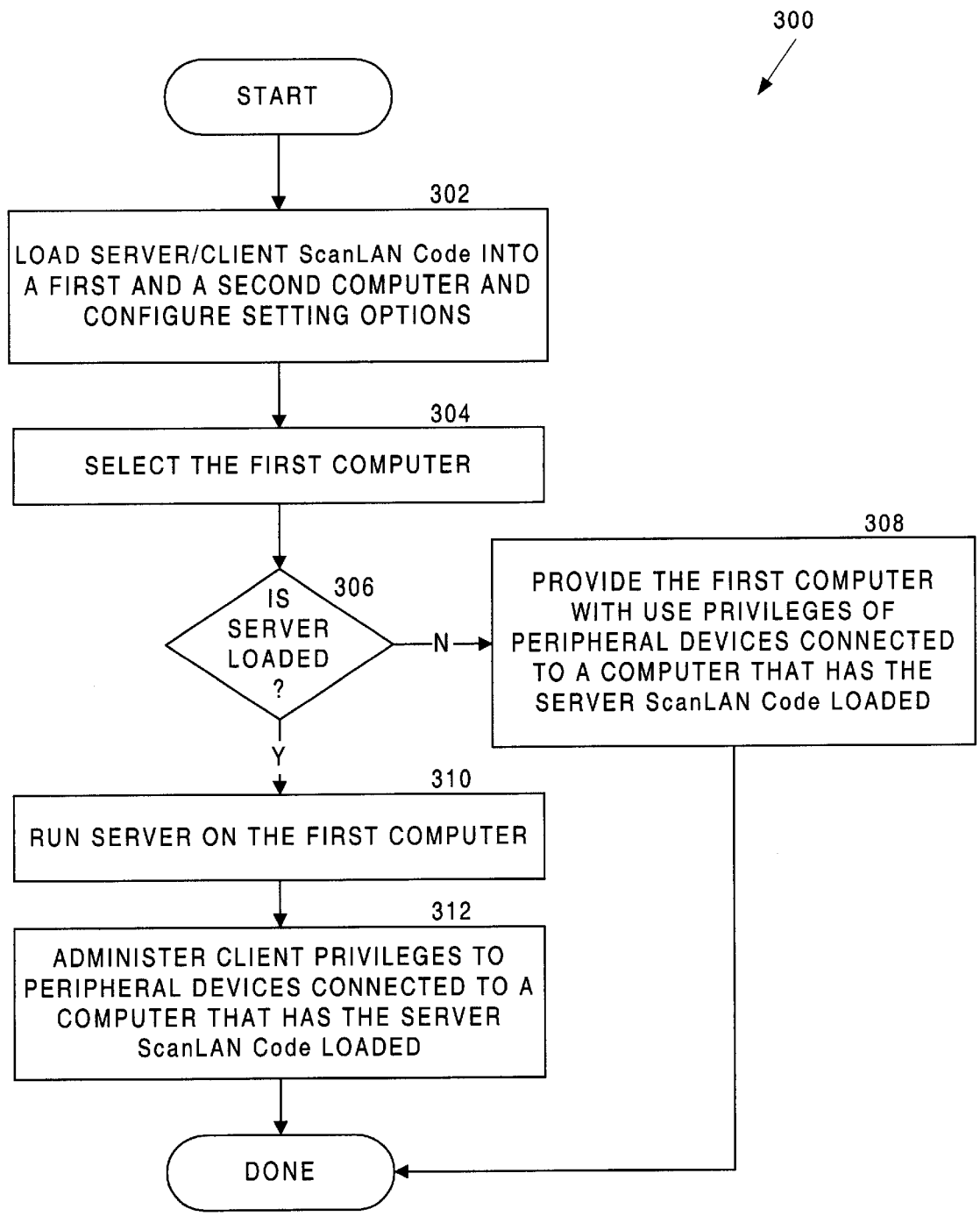
FIG. 3A is a flowchart diagram illustrating the preferred method operations that may be used to access remote peripheral devices from a local computer system in accordance with one embodiment of the present invention.

FIG. 3A is a flowchart diagram 300 illustrating the preferred method operations that may be used to access remote peripheral devices from a local computer system in accordance with one embodiment of the present invention. The method begins at an operation 302 where the Server/Client ScanLAN code is loaded onto at least a first computer and a second computer. Once the Server/Client ScanLAN code is loaded onto the first and second computer, the setting options of the Server and the Client ScanLAN program, may be modified at each one of the first and second computers.

It should be understood that the first and the second computers are merely two computers that are networked together over any network of computers. In addition, it is contemplated that any one of the networked computers may be loaded with either the Server or the Client ScanLAN code, or both the Server and the Client ScanLAN code, to enable access to the peripheral devices connected to each of the respective networked Server computers.

The method now proceeds to an operation 304 where the first computer is selected. By way of example, a user may have the second computer at a location that is remote from the first computer (e.g., another room, another cubical, another building or the like). When the first computer is selected, the method proceeds to a decision operation 306 where it is determined if the Server ScanLAN code was loaded onto the first computer. If the Server ScanLAN code was loaded onto the first computer, the method will proceed to an operation 310. In operation 310, the Server ScanLAN program is run on the first computer.

Generally speaking, the Server ScanLAN program may be run by selecting a Server ScanLAN icon from a list of programs that may be loaded onto the first computer. In one embodiment, the Server ScanLAN icon may be accessed by first selecting a START menu in a Windows 95/NT platform, and then selecting the Server ScanLAN icon from a list of programs that may be loaded on the first computer. Once the Server ScanLAN icon is selected and run in operation 310, the method will proceed to an operation 312 where the user may administer Client privileges (i.e., sharing options) to the peripheral devices connected to the first computer that, in this example, has the Server ScanLAN program running.

By way of example, if the first computer has the Server ScanLAN running, the user of the first computer (i.e., a Server) can grant use privileges on a per-peripheral device manner, so that clients connected to the first computer can share the peripheral devices. Generally speaking, the other users that are connected to the network should have the Client ScanLAN program loaded thereon to enable them to access the peripheral devices that are connected to the first computer, which is running the Server ScanLAN program.

In this manner, the user of the first computer may grant or deny access privileges to other computers (i.e., networked Clients), selected host adapters that are connected to the first computer, or to individual peripheral devices that are connected to their respective host adapters (that are connected to the first computer). This feature will be described in greater detail with reference to FIG. 3C below. Referring back to decision operation 306, if it is determined that the Server ScanLAN code was not loaded onto the first computer, the method will proceed to an operation 308.

In operation 308, the first computer is provided with use privileges of peripheral devices that are connected to a networked computer that has the Server ScanLAN code loaded thereon. For example, if any other computer over the network is running the Server ScanLAN program, those computers will be identified as available Server computers to the user of a Client ScanLAN program (if the Client is enabled to share SCSI peripheral devices across the network). The Client ScanLAN operation will be discussed in greater detail with respect to FIGS. 3D through 3G and FIG. 5 below.

Once the first computer is provided with the use privileges of the peripheral devices that are connected to the computers that have the Server ScanLAN code in operation 308, the method will end. Similarly, once the Client privileges are administered to the peripheral devices connected to a computer that has the Server ScanLAN code in operation 312 is complete, the method will also end. In one embodiment, device sharing rights may be set or modified as described in Table A below.

TABLE A

DEVICE SHARING RIGHTS

DEFAULT SHARING RIGHTS: Default sharing rights are initially assigned during a first installation of the Server ScanLAN code. The installation wizards provide an interface to easily set these values. Note however, that these default sharing rights can also be modified any time the Server is running by right-clicking on the devices in the Server application window of FIG. 3C.
PER-CLIENT SHARING RIGHTS: When a Client attaches to a Server for the first time, the Client is assigned the default sharing rights. The Server can then modify the Client's sharing rights to fit the needs of the individual Clients. This is done in the Server Scan LAN window of FIG. 3C by right-clicking on the Client name in the left hand pane of the server application. Another method for changing these values is to double-click on a Client name in the right-hand pane of the server application. This brings up the "Client Properties" page.
HOST ADAPTER SHARING RIGHTS: If the sharing rights for a host adapter are set to "Not Shared", none of the devices connected to that host adapter will be available.

Figure 3B:
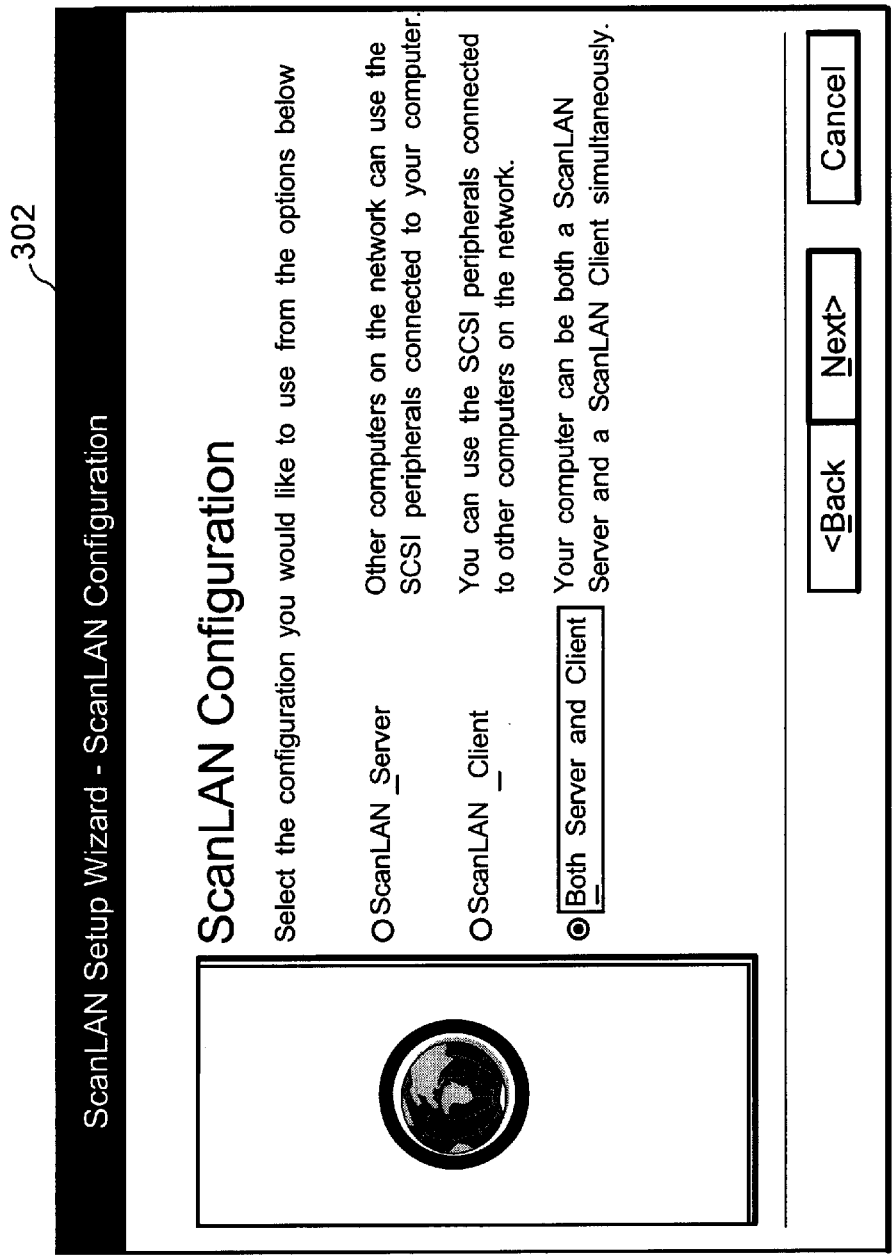
FIG. 3B shows a computer screen shot of a ScanLAN Setup wizard for use in accordance with one embodiment of the present invention.

FIG. 3B shows a screen shot 320 of a ScanLAN Setup wizard in accordance with one embodiment of the present invention. The ScanLAN Setup wizard is well suited to facilitate the loading and configuring of the S/C ScanLAN program on computers that are networked together. By way of example, each computer of a given network may be provided with either the Server ScanLAN application, the Client ScanLAN application, or both the Server and the Client ScanLAN applications, depending on their needs. Accordingly, each computer in the given network can be both a Server and a Client for purposes of using this ScanLAN software.

As mentioned above, when the computer is loaded with the Server ScanLAN program, other computers on a network can use the SCSI peripheral devices that are connected to the computer that has the Server ScanLAN application, provided that sharing is allowed. Alternatively, if the computer only has the Client ScanLAN application loaded thereon, the user of that computer will be allowed to use the SCSI peripheral devices that are connected to any one of those computers that have the Server ScanLAN application, provided sharing privileges are allowed. Accordingly, using the ScanLAN Setup wizard of window 320, the user may step through a series of configuration and setup windows.

Figure 3C:
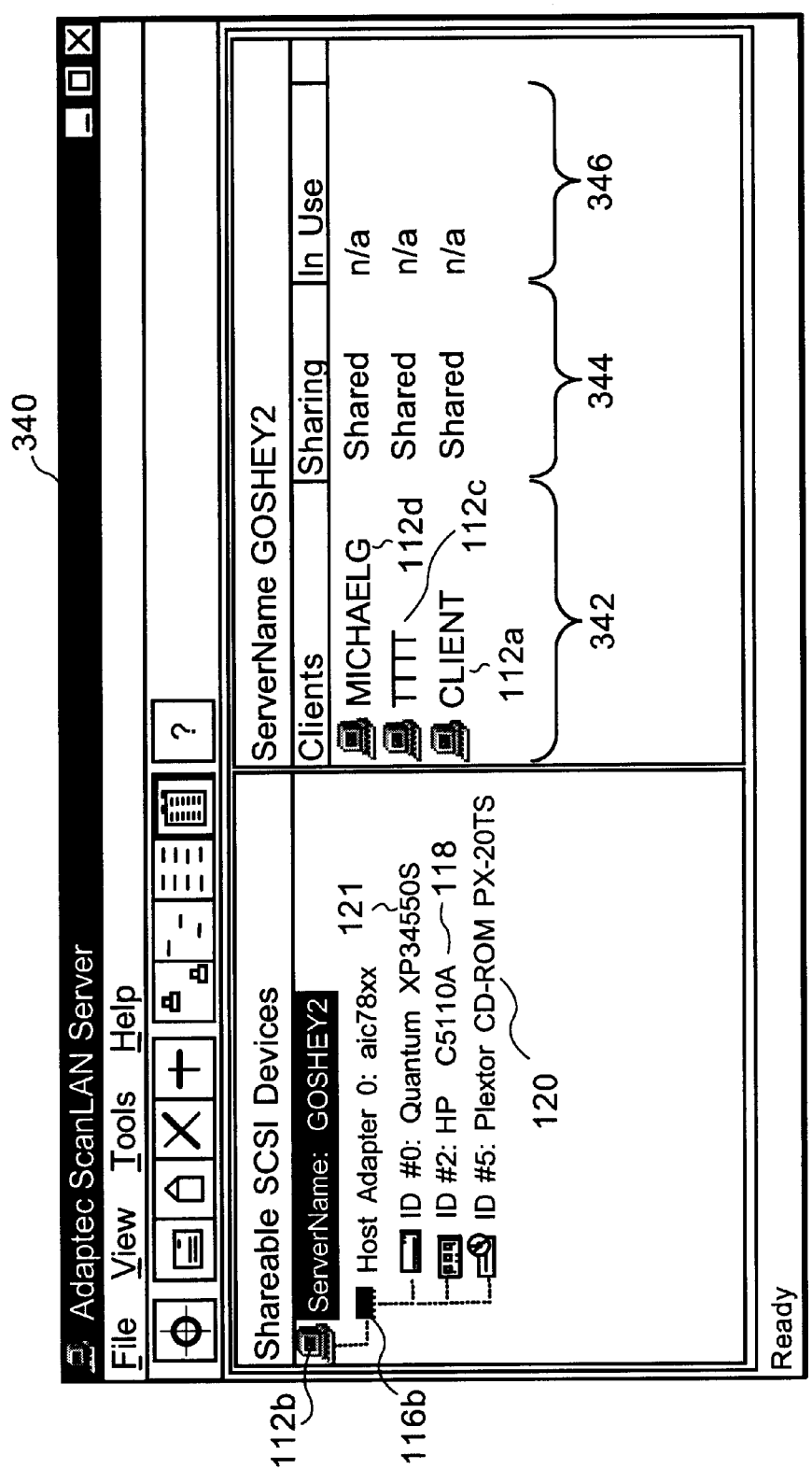
FIG. 3C shows a Server ScanLAN window that is displayed to the user when the Server ScanLAN application is run in accordance with one embodiment of the present invention.

FIG. 3C shows a Server ScanLAN window 340 that is displayed to the user when the Server ScanLAN application is run in accordance with one embodiment of the present invention. As shown, the Server ScanLAN window 340 includes a list of shareable SCSI devices that are physically connected to the computer that has the Server ScanLAN application. By way of example, computer 112b of FIG. 2C has a host adapter 116b, which is connected to the scanner 118, the optical drive 120, and the hard drive 121.

Each of these peripheral devices is therefore pictorially shown in a tree orientation depending from the host adapter 116b in the Server ScanLAN window 340. As mentioned above, these peripheral devices will therefore be shareable over the network with computers that have the Client ScanLAN application running. As shown, the network that the computer 112b is connected to has computers 112a, 112c, and 112d identified as Clients 342. For each of the Clients 342, there is also an indication of whether sharing 344 is allowed, and whether each of those Clients is in-use 346. Furthermore, message communication between networked Clients and Servers is also needed to enable efficient and informed sharing of peripheral devices over a network.

In one embodiment, the Server ScanLAN is configured to communicate with the Client ScanLAN. These communications are generally in the form of messages, that assist users of the Client ScanLAN's in utilizing the shared peripheral devices in an informed manner. Several exemplary messages are shown below in Table B.

TABLE B

SENDING MESSAGES TO CLIENTS

SHUTDOWN: When the Server is ready to shut down, it will preferably send a message to all Clients. It is then the responsibility of the Clients to detach from the Server.
DEVICE IN USE: If a Client attempts to reserve a device which is already reserved by another Client, the Server will send a message to the Client letting it know the particular device requested is busy.

In one embodiment, the S/C ScanLAN uses a Microsoft API called remote procedure call (RPC) subsystem in order to send advanced SCSI programming Interface (ASPI) requests (and other requests) across a network. The Microsoft RPC subsystem works well because it uses little overhead while providing acceptable performance across a network.

A typical RPC subsystem is based on a Client/Server model of functionality. This means that the Client is free to call upon the Server to perform various tasks whenever the Client desires. Although this method works well, a standard RPC does not provide a way for the Server to call its Clients whenever it desires. For example, the Server is conventionally only allowed to send a message to a Client when the Server is processing a request from a Client.

To remedy this problem, a second Client/Server interface is created. In this embodiment, the second Client/Server interface (i.e., a call-back sub-interface) is configured to pass messages from the Server to the Client. To accomplish this, the Server ScanLAN application is set to respond as if it were a Client ScanLAN application, and the Client ScanLAN application is set to respond as if it were a Server ScanLAN application. Once the Client and Server respond as described above for the purpose of sending messages from the Server to the Client, the Server application can send a number of informative messages to the Client during its operation.

For example, when a computer running a Server ScanLAN application is about to be shutdown, that Server will send a message to all Clients informing them of the shutdown so they can clean up any of their applications that are using the Server (i.e., a peripheral device that is connected to the Server). Another example of when the Server needs to send a message to the Clients is when a wait queue is accessed, and the Server needs to let the next Client know it can now use a device that is connected to the Server. Other messages may include plug-n-play messaging.

Figure 3D:
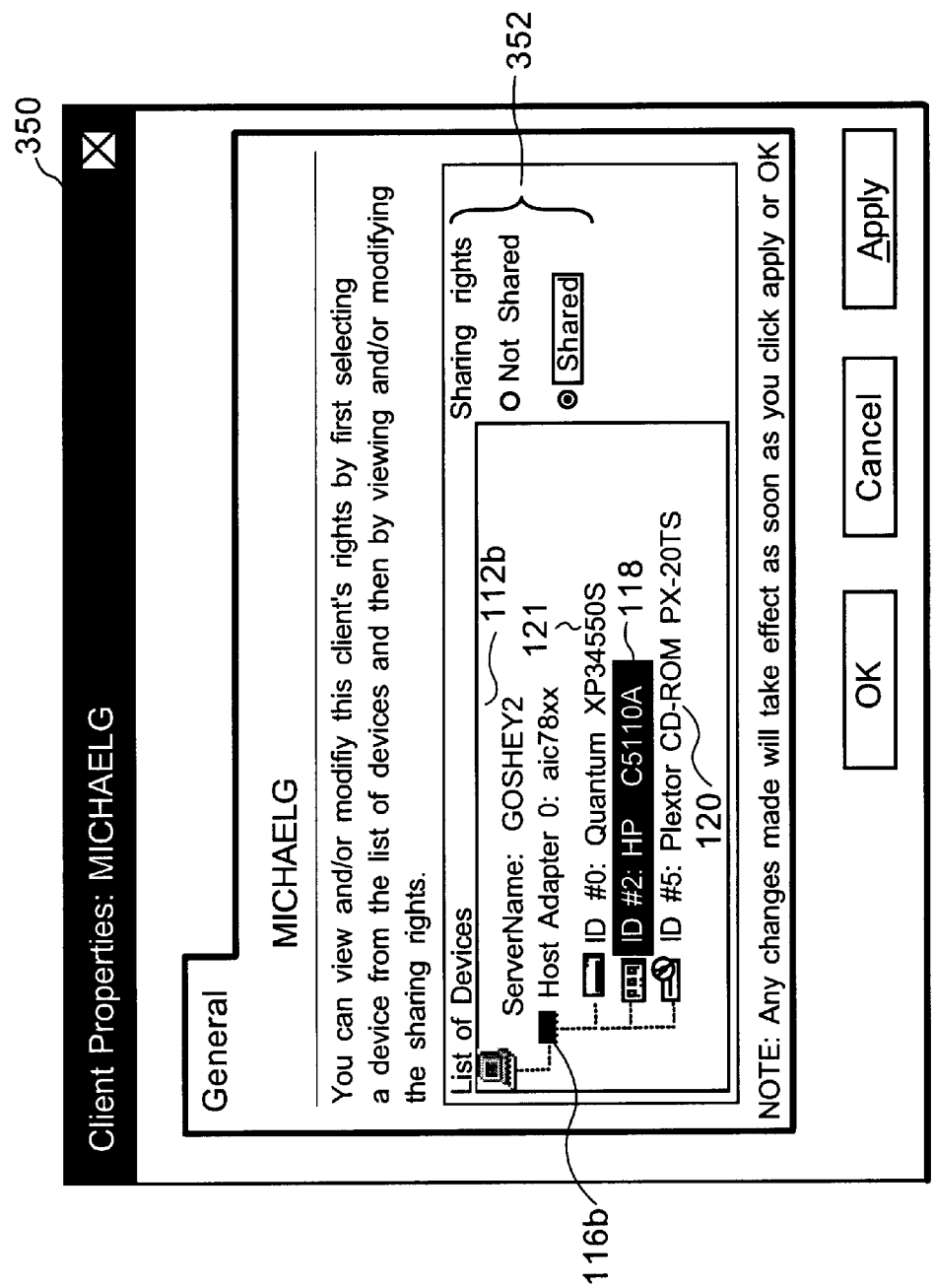
FIG. 3D shows a properties computer screen shot that is used to modify sharing rights for Client's use of selected devices in accordance with one embodiment of the present invention.

Referring back to the Server ScanLAN window 340 of FIG. 3C, the user may select one of the peripheral devices 118, 120, or 121, and then designate them to be "Shared or Not shared" by one of the Clients 342 by right-clicking on one of the Clients 342. For example, as shown in FIG. 3D, when the Client 112d is selected, the user can modify the sharing rights to a particular peripheral device. Window 350 therefore shows the list of devices that are connected to computer 112b that has the Server ScanLAN application. Further, the user is able to view and/or modify the Client's sharing rights by first selecting a device from the list of devices, and then view and/or modify the sharing rights 352.

In this example, the scanner 118 is selected and is marked to be shared from the sharing rights 352. Once the sharing rights have been modified in accordance with the user's desire, the sharing rights will become effective once the OK or the APPLY icon is selected from window 350. Of course, the sharing rights of any one of the other peripheral devices or the host adapter can also be modified.

Figure 3E:
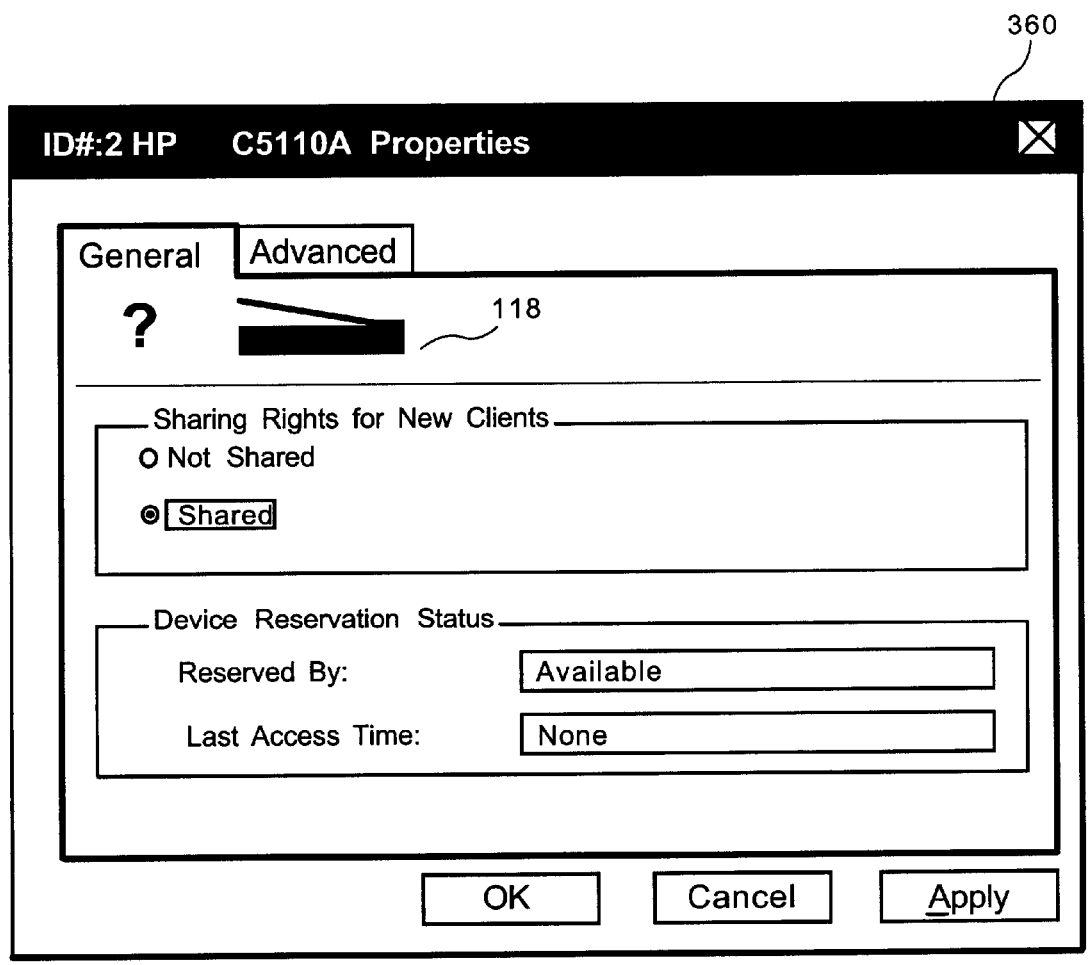
FIG. 3E shows a properties window 360 in accordance with one embodiment of the present invention.

FIG. 3E shows a properties window 360 in accordance with one embodiment of the present invention. When the user selects the scanner 118 from the list of devices shown in FIG. 3D, the particular sharing rights for that peripheral device will be appropriately identified. As shown, the scanner 118 is selected to be a "shared" peripheral device. In addition, the properties window 360 shows the device reservation data for that scanner 118.

Figure 3G:
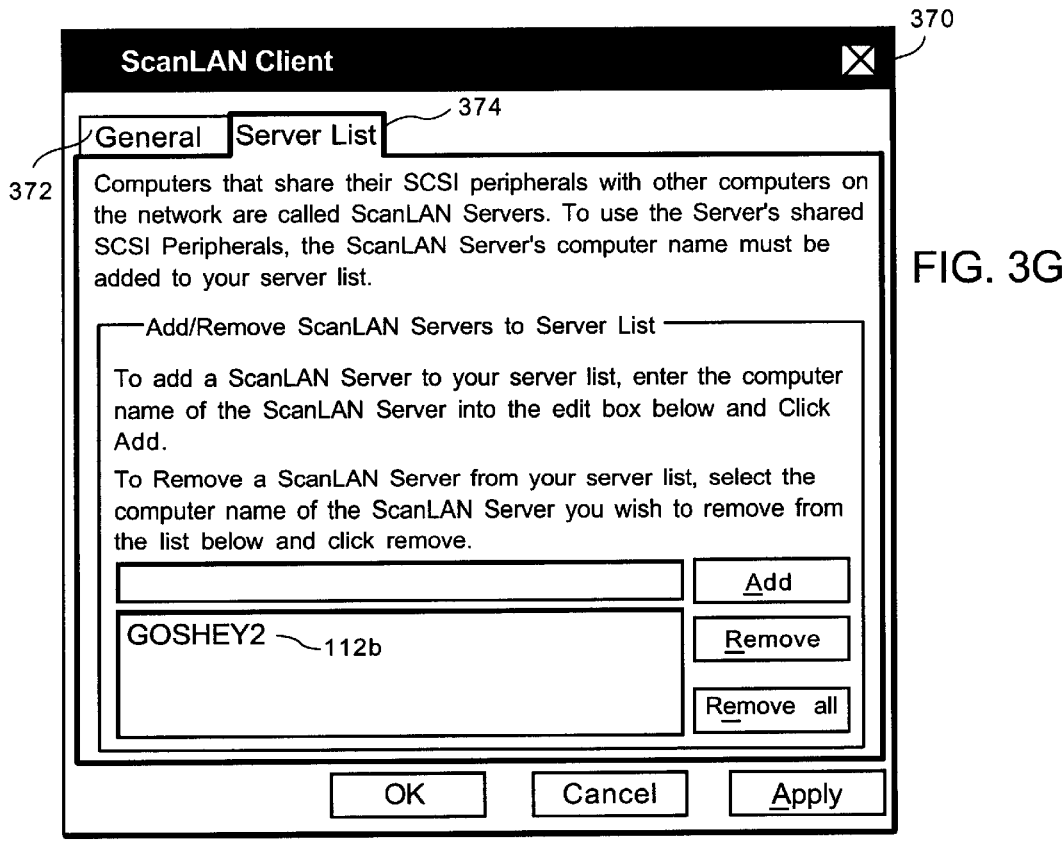
FIGS. 3F and 3G show computer screen shots that may be used to modify sharing and use rights of particular Clients in accordance with one embodiment of the present invention.
Figure 3F:
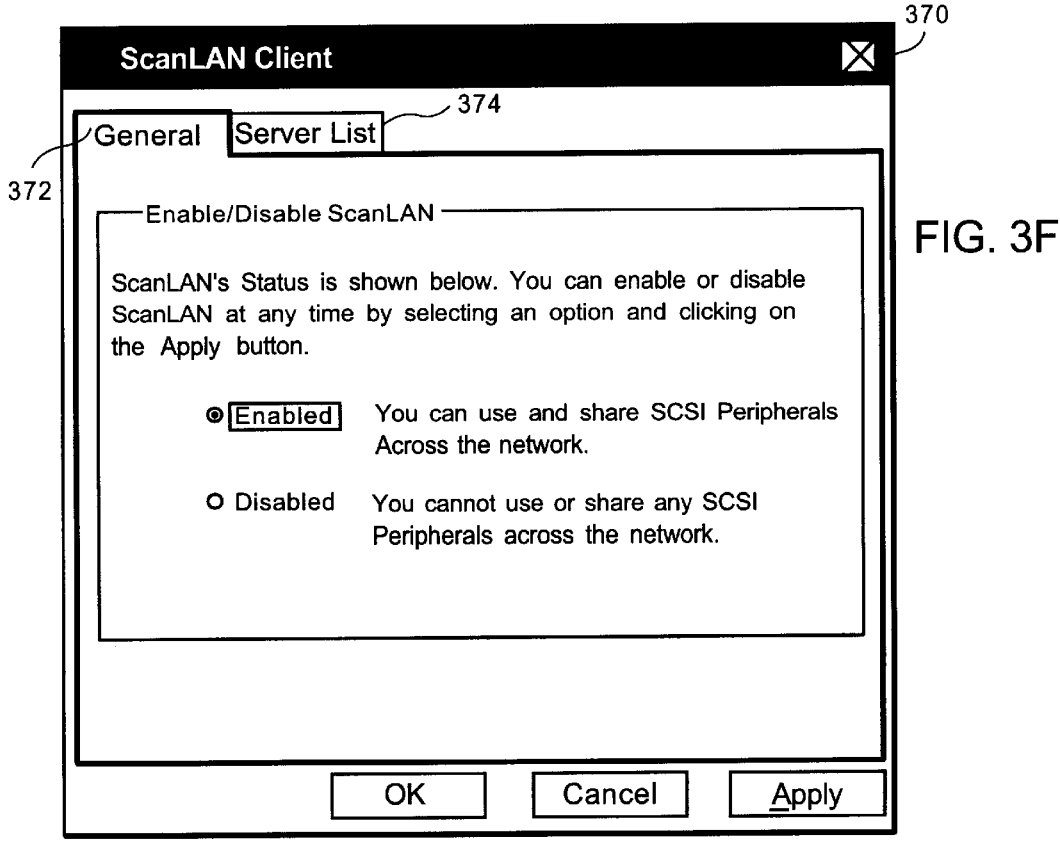

FIG. 3F shows a Client ScanLAN window 370 in accordance with one embodiment of the present invention. The Client ScanLAN window 370 has a general selection 372, which allows the user having the Client ScanLAN application loaded on its computer to enable or disable the Client ScanLAN application. As shown, a user can enable or disable the Client ScanLAN application at any time by selecting that option and clicking on the APPLY button. When the Client ScanLAN is enabled, the user of that computer can use and share SCSI peripherals across the network that are physically connected to a computer having the Server ScanLAN application (provided that Client is given enough sharing privileges by the user of the Server ScanLAN application). On the other hand, when the Client ScanLAN is disabled, the user cannot use or share any SCSI peripheral device across the network.

FIG. 3G shows the Client ScanLAN window 370 having a server list 374 selected in accordance with one embodiment of the present invention. As mentioned above, computers that share their SCSI peripheral devices with other computers on a network are called Servers. To use the Server's shared SCSI peripherals, the Server ScanLAN computer name must be added to the server list shown in FIG. 3G. In this embodiment, computer 112b is identified as being a computer that has the Server ScanLAN application loaded thereon. Of course, additional computers having the Server ScanLAN application may also be added to the list or removed at any time. Exemplary Client ScanLAN management functionalities are shown below in Table C.

TABLE C

CLIENT MANAGEMENT

LIST OF CLIENTS: The Server maintains a list of Clients that have attached to the Server. The Server is also responsible for maintaining the per-Client sharing rights of all Clients. This information is persistent and should be restored each time the Server is launched.
ADD/DELETE CLIENTS: The Server can add and delete Clients at will. Newly added Clients will receive the default access rights. In one embodiment, any deleted Clients will not return in the Client list until the Client attempts to connect to the Server at a later time.
PLUG-N-PLAY: When devices are added or removed via a plug and play mechanism, the Server will update itself appropriately.

Figure 3H:
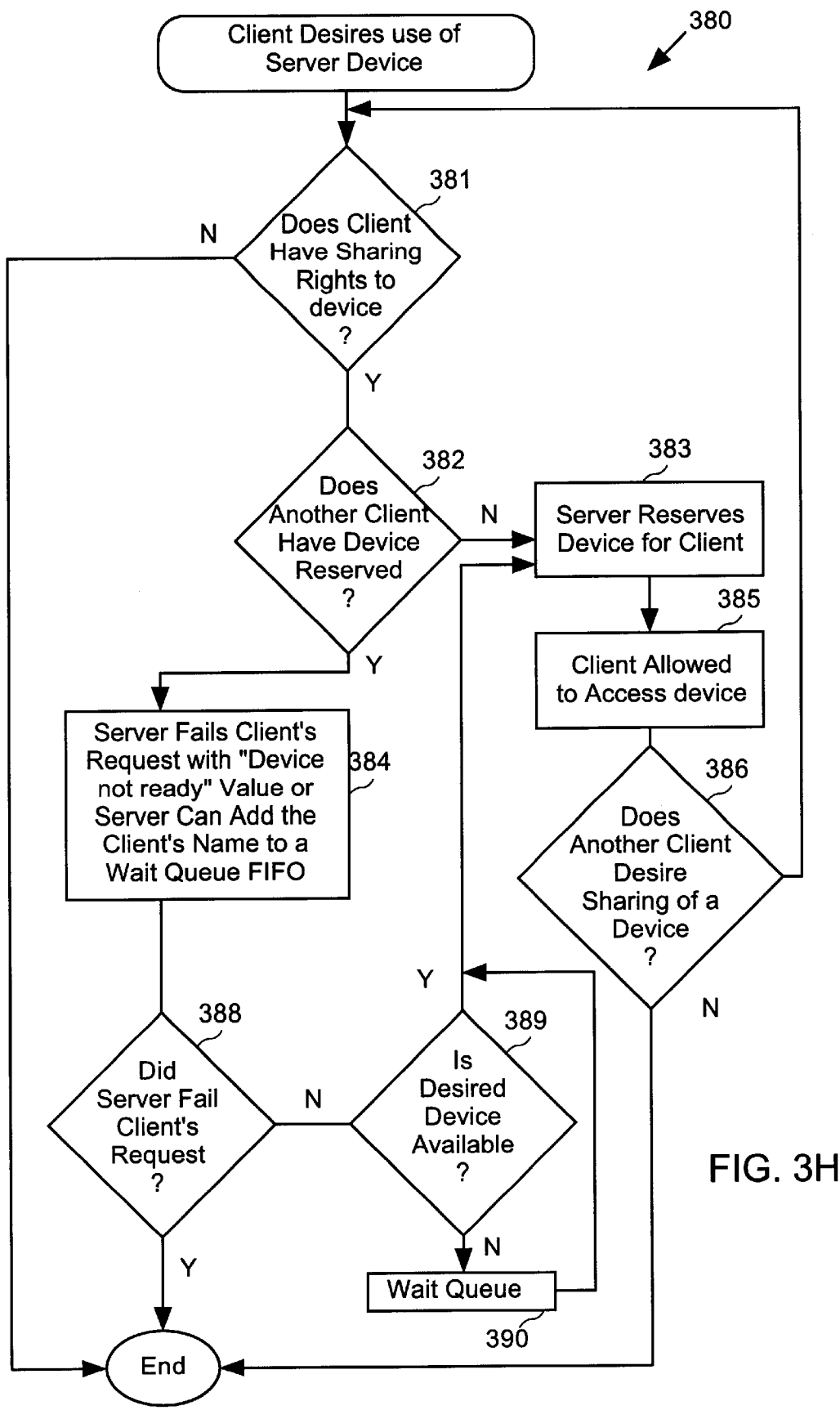
FIG. 3H is a flowchart diagram illustrating the preferred method operations performed when a Client desires the use of a particular device that is connected to a Server in accordance with one embodiment of the present invention.

FIG. 3H is a flowchart diagram 380 illustrating the preferred method operations performed when a client desires the use of a particular device that is connected to a Server in accordance with one embodiment of the present invention. When a Client attempts to access a SCSI device that is connected to a Server, the method will proceed to a decision operation 381. In decision operation 381, the Server first determines whether the Client making the request to access the SCSI device has the proper sharing rights to use the requested device. If the Client does not have the proper sharing rights, the method will end. On the other hand, if the Client has sharing rights for the requested device, the method will proceed to a decision operation 382.

In decision operation 382, the Server determines whether another Client already has the requested device reserved (i.e., another Client is currently using the requested device). If the device is not reserved by another Client, the method will proceed to an operation 383 where the Server reserves the requested device in the name of the requesting Client. The method will then proceed to an operation 385 where the requesting client is allowed to access the requested device.

On the other hand, if it is determined in operation 382 that the requested device is already reserved by another Client, the method will proceed to an operation 384. In operation 384, the Server can either fail the Client's request with a "Device Not Ready" return value, or the Server can add the Client's name into a "wait" queue. This wait queue stores Client names on a FIFO (First-In, First-Out) basis. From operation 384, the method proceeds to a decision operation 388 where it is determined whether the Server failed the Client's request. If the Server did fail the Client's request, the method will end.

Alternatively, if the Server does not fail the Client's request, the method will proceed to a decision operation 389 where it is determined whether the desired device is available. If it is not, the method will proceed to an operation 390 where the request is placed in the wait queue as described above. When the device becomes available, the method will proceed through operations 383 and 385. In general, Server may now bring the next name off the wait queue, reserve the device for that Client, and send a message informing the Client that it may now use the device it requests. After operation 385, the method will proceed to a decision operation 386 where it is determined whether another Client desires sharing of a device from a Server. If no other Clients do, the method will end. However, if another Client desires sharing to a peripheral device (i.e., a scanner) that is connected to a computer that has the Server ScanLAN application running, the method will proceed back to decision operation 381.

Figure 4A:
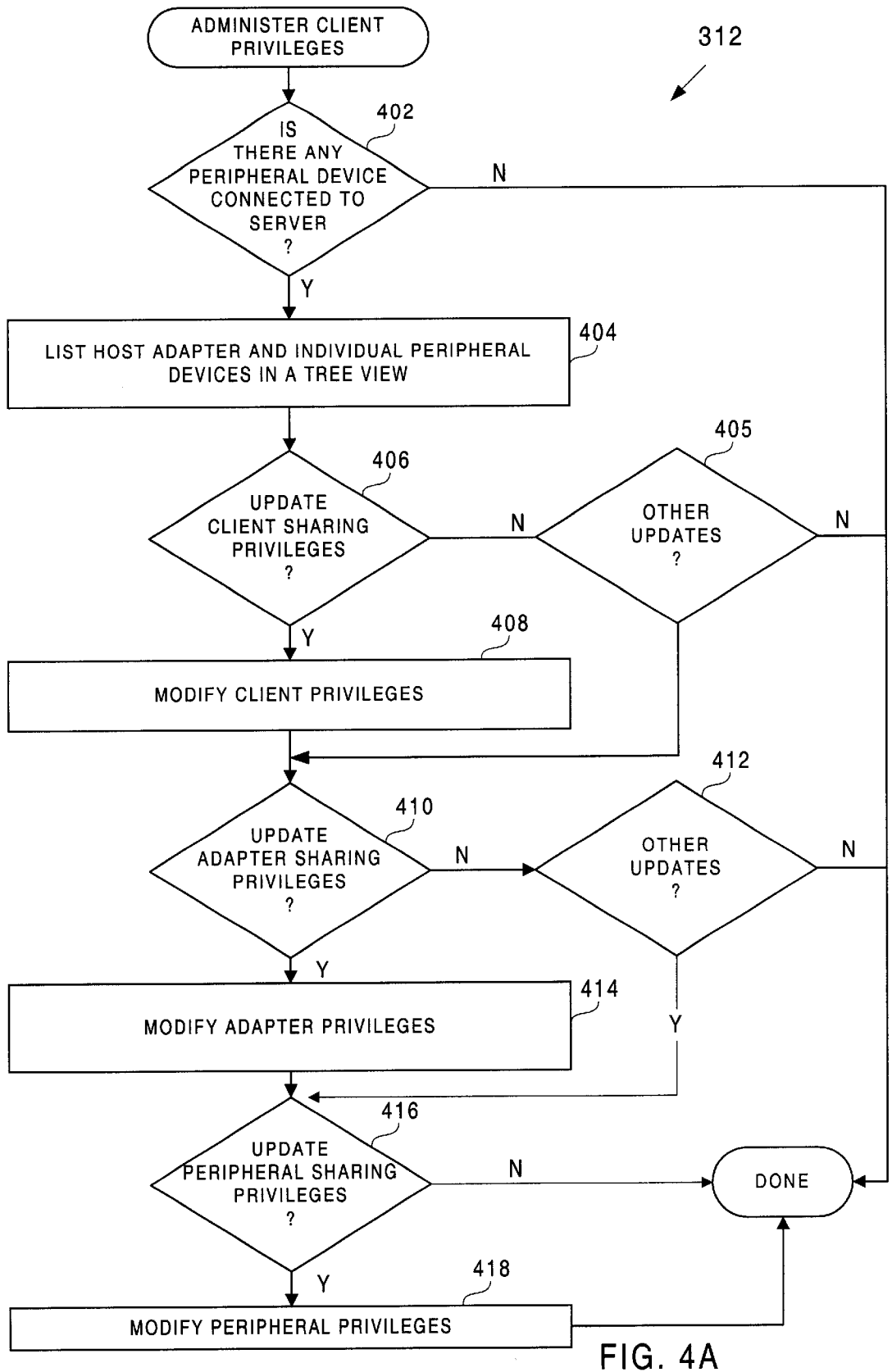
FIG. 4A shows a more detailed flowchart diagram of an operation of FIG. 3A, which describes the administering of Client privileges in accordance with one embodiment of the present invention.

FIG. 4A shows a more detailed flowchart diagram of operation 312 of FIG. 3A, which describes the administering of Client privileges in accordance with one embodiment of the present invention. The administering of Client privileges begins at a decision operation 402, where it is determined if there are any peripheral devices connected to a Server. As described above, the Server can be any computer that is connected to a network and has the Server ScanLAN application loaded thereon.

Accordingly, if it is determined in operation 402 that there are peripheral devices connected to the Server, the method will proceed to an operation 404. In operation 404, the host adapters and the peripheral devices that are connected to those host adapters of a Server are listed in a tree view (or any other desired icon view or Windows list). By way of example, FIG. 3C shows the Server ScanLAN window 340 which lists those host adapters and associated peripheral devices that are connected to computer 112b, which has the Server ScanLAN application loaded thereon.

On the other hand, if it is determined in operation 402 that there are no peripheral devices connected to the Server, then the method will end because there are no devices that may be shared by the computer having the Server ScanLAN application. Referring now to decision operation 406, where it is determined whether an update to Client sharing privileges is desired. For example, the user may desire to disable any one of the Clients 342 listed in FIG. 3C from sharing the peripheral devices connected to computer 112b (which acts as a Server) in operation 408.

Alternatively, if no updates are desired for Client sharing privileges, the method will proceed to a decision operation 405. In decision operation 405, it is determined if there are any other updates to sharing privileges of adapters or peripheral devices connected to the server computer. If there are, the method will proceed to a decision operation 410. In decision operation 410, it is determined whether an update to adapter sharing privileges is desired. By way of example, if the user desires to no longer share the peripheral devices that are connected to a particular adapter that is connected to the Server computer, this update may be performed by right-clicking on the adapter icon shown in FIG. 3C above, and then modifying the adapter privileges in operation 414.

If it is determined in operation 410 that there are no adapter sharing privilege updates, the method will proceed to a decision operation 412. In decision operation 412, it is determined whether other updates are desired. If other updates are desired, the method proceeds to an operation 416 where it is determined if there is an update desired for peripheral device sharing privileges. If there are, those privileges may be modified in operation 418. By way of example, the user may select a particular peripheral device 118, 120, or 121 from the list of shareable SCSI devices of FIG. 3C, and then modify their respective sharing privileges. On the other hand, if it is determined in operation 416 that no update is desired for the sharing of peripheral devices, the method will end.

Figure 4B:
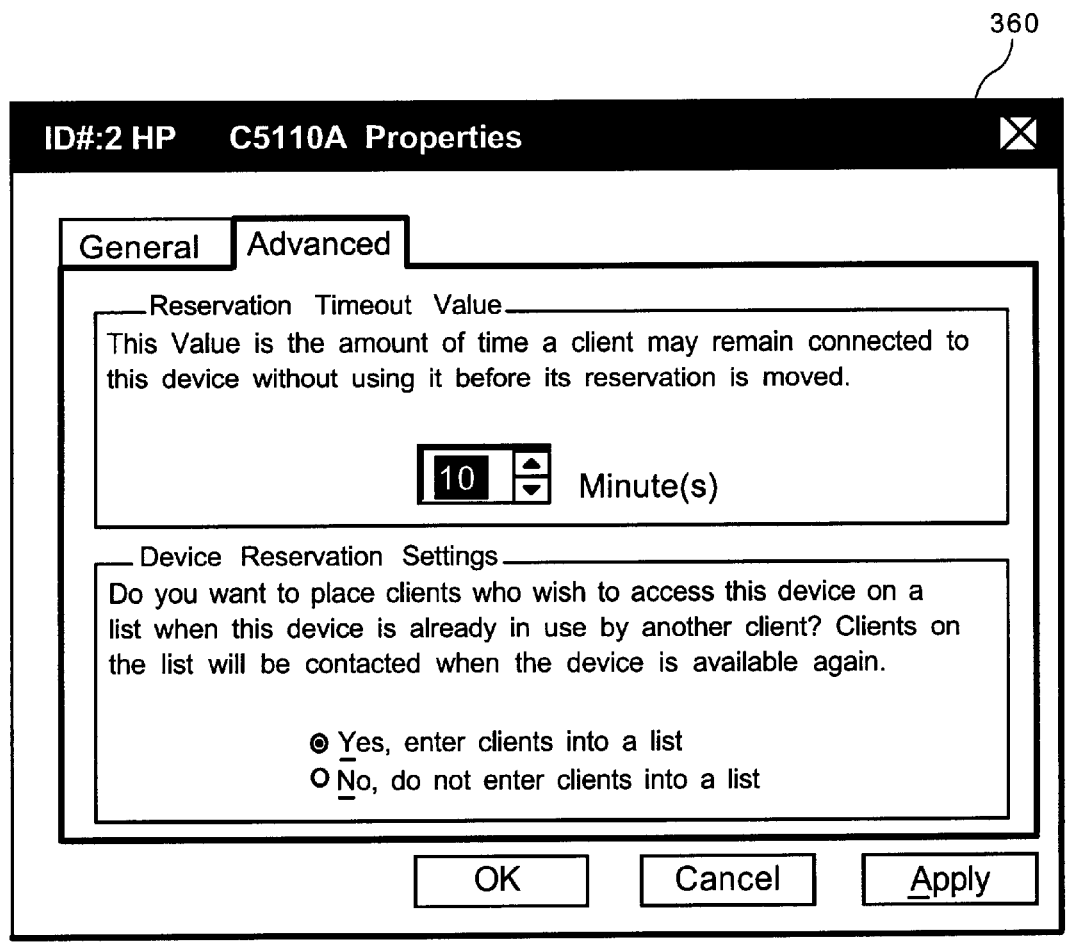
FIG. 4B shows the properties window of FIG. 3E when an advanced button is selected in accordance with one embodiment of the present invention.

FIG. 4B shows the properties window 360 of FIG. 3E when the advanced button 362 is selected in accordance with one embodiment of the present invention. In the advanced selections, the user is allowed to custom set a reservation time-out value. The reservation time-out value is the amount of time that a computer having the Client ScanLAN software loaded thereon, may remain connection to a particular device without using it before its reservation is removed.

By way of example, if a Client computer is connected to a scanner of a Server ScanLAN computer (that is connected to the network), and no activity is detected for X minutes, the reservation will be removed. Accordingly, this time-out value may be modified depending on the number of computers that are networked and the activity a particular peripheral device receives. In addition, the advanced properties will also allow a user to place Clients that wish to access a particular device that is currently being used by another Client in a waiting list. The waiting list therefore will represent a queue of Clients that desire the use of a particular peripheral device that is currently being used by another Client or the Server computer itself. Exemplary device sharing rules are described below in Table D.

TABLE D

DEVICE RESERVATION

ONE AT A TIME: A device can only be reserved by one computer at a time. If the device is already reserved when another computer attempts to access the device, the Server sends a message to the Client who is trying to access the device informing them that the device is currently reserved by another Client.
SERVER NEEDS TO RESERVE DEVICES: When the Server uses a device on their own system, the Server application knows this and will display the word "Server" in the "In Use" field of the left pane of the Server application window. No Clients will be allowed to access this device when the Server has it reserved. Therefore, the Server must also reserve a device in order to use it just like a remote Client. This functionality is very important when sharing devices. Although the server has the ability to remove a reservation on a device, it must be a conscious decision on the part of the Server user to remove a Client's reservation on a device. Otherwise, whenever the server desires to use a shared device on its system, it would bump a Client off, even if it was in the middle of performing a task.
FREEING A DEVICE: If a device is reserved by a Client, the Server application can remove the Client's reservation status by right-clicking on the Client name who has the device reserved and selecting "Remove Reservation". This option will be disabled in the pop-up menu if the device is not currently reserved. If the Server has the device reserved, right-click on any Client name and select the "Remove Reservation" menu item to free the Server's reservation on a device.
AUTO-RELEASE: Each device has a setting representing the amount of time (in minutes or the like) that this device may sit idle (no accesses) while currently reserved by a Client. If another Client is waiting to use the device and this time limit has been reached, the Server will automatically remove the reservation on the device and reserve the device in the name of the waiting Client. This feature can be enabled/disabled on a per-device basis as shown in FIG. 4B. Likewise, the time-out value can be set for each device. If no Client is waiting to use the device and the time limit is reached, the Server does not have to remove the reservation.
AUTO-RESERVING: If the Server reserves a device for a Client as described above, the Server is then responsible for sending a message to the Client who just got the reservation to let it know it can now use the device.

Figure 5:
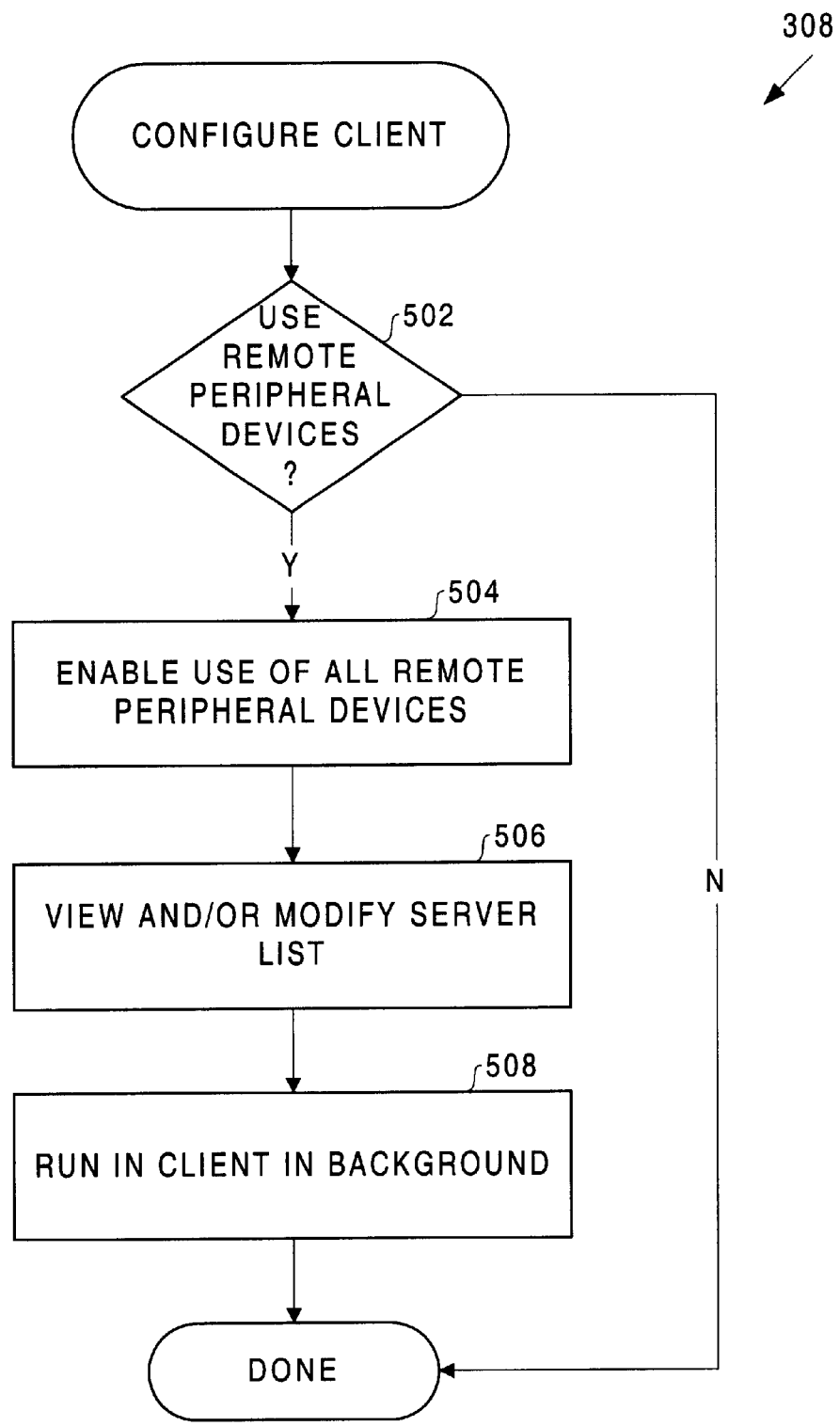
FIG. 5 shows a flowchart diagram that is a more detailed description of an operation of FIG. 3A in accordance with one embodiment of the present invention.

FIG. 5 shows a flowchart diagram that is a more detailed description of operation 308 of FIG. 3A in accordance with one embodiment of the present invention. The method begins at an operation 502 where it is determined whether the Client desires to use a remote peripheral device (i.e., one that is not connected to the local computer, but is networked to the local computer). If the user does not wish to use a peripheral device that is physically connected to a remote computer that has the Server ScanLAN application, the method will be done. On the other hand, if the user does wish to use a peripheral device that is connected to a remote computer (i.e., a computer having the Server ScanLAN and associated peripheral devices), the method will proceed to an operation 504.

In operation 504, the user may enable use of all remote peripheral devices as shown in FIG. 3F above. The method will then proceed to an operation 506 where the user may view and/or modify the list of Servers as shown in FIG. 3G. Next, the method will proceed to an operation 508 where the Client is allowed to run in the background of the computer having the Client ScanLAN application. That is, the user having the Client ScanLAN application running will be able to use other programs on their computer, and access peripheral devices as if those peripheral devices were all connected locally to the Client computer.

In general, the Client ScanLAN Application is completely transparent to existing I/O applications. For example, a DeskScan program currently on the market from Hewlett-Packard (HP) of Palo Alto, Calif., is written to provide support for their scanners through a well known ASPI for a Win32 layer. When the ScanLAN code is installed as a Server, which has the scanner installed, the DeskScan program performs exactly as before without modification. Therefore, without any further modifications, the Client ScanLAN machine can now see and use the HP Scanner as if it were connected to the Client's machine once the DeskScan software is installed on the Client. This is what is meant by transparent. In fact, the HP DeskScan program is completely unaware that the scanner is not physically attached to the client system.

Accordingly, the only knowledge that a user operating the Client ScanLAN has of the existence of the Client ScanLAN application is a small icon that is displayed in the task bar of a Windows (i.e., 95, 98, etc.) or Windows NT (i.e., 3.51, 4.0, 5.0, etc.) platform. This is particularly advantageous because the use of a Client ScanLAN application will be transparent to the user, and its use does not require additional hardware nor special peripheral devices. Of course, the Client can only share those peripheral devices for which sharing privileges are allowed via the Server ScanLAN application.

In one embodiment of the present invention, the ScanLAN application is well suited to operate on a Windows platform. By way of example, in the Windows 95/98 platform, IPX, NetBEUI, and TCP/IP network protocols are supported, and in the Windows NT Platform, IPX, NetBEUI, TCP/IP and Named Pipes network protocols are supported. In this manner, the above described Microsoft RPC (Remote Procedure Call) and ASPI for Win32 will operate in a good interfacing manner. Of course, suitable modifications may be performed so that the ScanLAN application can function on other operating systems, such as a UNIX operating system, an Apple Computer, Inc. operating system or the like.

The invention may employ various computer-implemented operations involving data stored in computer systems to drive computer peripheral devices (i.e., in the form of software drivers and programs). These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 6:
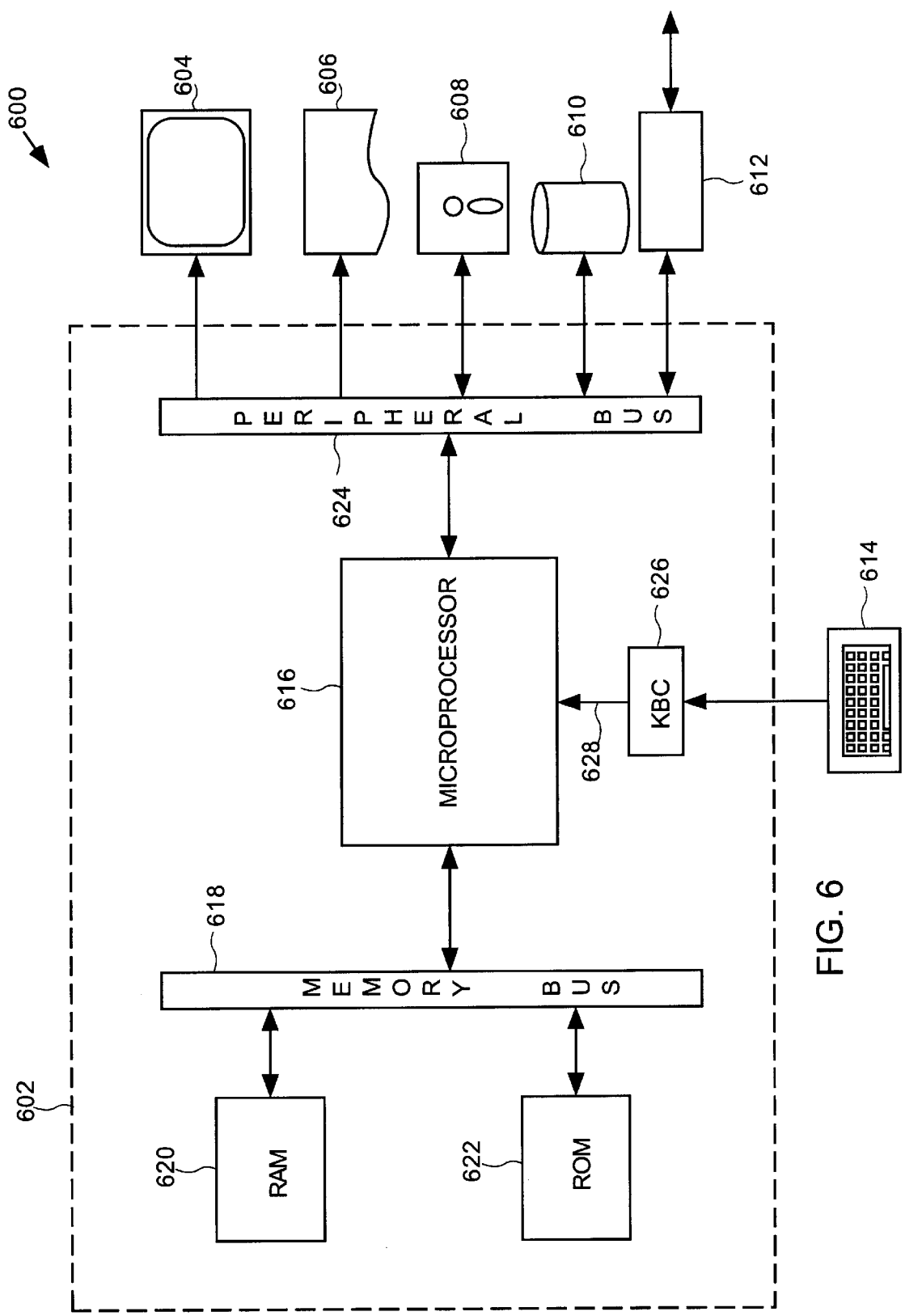
FIG. 6 is a block diagram of an exemplary computer system for carrying out the processing according to the invention.

FIG. 6 is a block diagram of an exemplary computer system 600 for carrying out the processing according to the invention. The computer system 600 includes a digital computer 602, a display screen (or monitor) 604, a printer 606, a floppy disk drive 608, a hard disk drive 610, a network interface 612, and a keyboard 614. The digital computer 602 includes a microprocessor 616, a memory bus 618, random access memory (RAM) 620, read only memory (ROM) 622, a peripheral bus 624, and a keyboard controller 626. The digital computer 600 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 616 is a general purpose digital processor which controls the operation of the computer system 600. The microprocessor 616 can be a single-chip processor or can be implemented with multiple components. Using instructions retrieved from memory, the microprocessor 616 controls the reception and manipulation of input data and the output and display of data on output devices. According to the invention, a particular function of microprocessor 616 is to assist in the transparent sharing of peripheral devices over a network.

The memory bus 618 is used by the microprocessor 616 to access the RAM 620 and the ROM 622. The RAM 620 is used by the microprocessor 616 as a general storage area and as scratch-pad memory, and can also be used to store input data and processed data. The ROM 622 can be used to store instructions or program code followed by the microprocessor 616 as well as other data.

The peripheral bus 624 is used to access the input, output, and storage devices used by the digital computer 602. In the described embodiment, these devices include the display screen 604, the printer device 606, the floppy disk drive 608, the hard disk drive 610, and the network interface 612. The keyboard controller 626 is used to receive input from keyboard 614 and send decoded symbols for each pressed key to microprocessor 616 over bus 628.

The display screen 604 is an output device that displays images of data provided by the microprocessor 616 via the peripheral bus 624 or provided by other components in the computer system 600. The printer device 606 when operating as a printer provides an image on a sheet of paper or a similar surface. Other output devices such as a plotter, typesetter, etc. can be used in place of, or in addition to, the printer device 606.

The floppy disk drive 608 and the hard disk drive 610 can be used to store various types of data. The floppy disk drive 608 facilitates transporting such data to other computer systems, and hard disk drive 610 permits fast access to large amounts of stored data.

The microprocessor 616 together with an operating system operate to execute computer code and produce and use data. The computer code and data may reside on the RAM 620, the ROM 622, or the hard disk drive 610. The computer code and data could also reside on a removable program medium and loaded or installed onto the computer system 600 when needed. Removable program mediums include, for example, CD-ROM, PC-CARD, floppy disk and magnetic tape.

The network interface 612 is used to send and receive data over a network connected to other computer systems. An interface card or similar device and appropriate software implemented by the microprocessor 616 can be used to connect the computer system 600 to an existing network and transfer data according to standard protocols.

The keyboard 614 is used by a user to input commands and other instructions to the computer system 600. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for sharing peripheral devices over a network, comprising:
    a first computer having at least one peripheral device connected thereto, the first computer being configured to respond as a server computer;
    a second computer networked to the first computer, the second computer being configured to respond as a first client computer and to send a request to use the at least one peripheral device over the network, the request being processed to determine whether the second computer has sharing privileges to the at least one peripheral device, the first computer being configured to grant access to the request of the second computer if the second computer has sharing privileges that enable access to the at least one peripheral device, and, when the second computer has access to the at least one peripheral device, the second computer communicating commands over the network to control the at least one peripheral device that is connected to the first computer;
    a third computer networked to the first and second computers, the third computer being configured to respond as a second client computer and to send a request to use the at least one peripheral device over the network, the request being processed to determine whether the third computer has sharing privileges to the at least one peripheral device, the first computer being configured to grant access to the request of the third computer if the third computer has sharing privileges that enable access to the at least one peripheral device, and, when the third computer has access to the at least one peripheral device, the third computer communicating commands over the network to control the at least one peripheral device that is connected to the first computer; and
    a wait queue for storing a use request from one of the second and third computers when the at least one peripheral device is in use, wherein, when a use request is stored in the wait queue, the first computer notifies the computer issuing the use request when the at least one peripheral device becomes available.

2. A system for sharing peripheral devices over a network as recited in claim 1, wherein the sharing of peripheral devices is configured from graphical user interfaces.

3. A system for sharing peripheral devices over a network as recited in claim 1, wherein the first peripheral device is selected from the group consisting of a scanner, a tape drive, a CD-R drive, a removable drive, and a hard drive.

4. A system for sharing peripheral devices over a network as recited in claim 1, wherein the commands communicated over the network by the second and third computers to control the at least one peripheral device that is connected to the first computer are SCSI commands.

5. A system for sharing peripheral devices over a network as recited in claim 1, further comprising:
    a second peripheral device connected to the third computer, wherein the third computer is configured to grant the first and second computers access to the second peripheral device if the first and second computers have sharing privileges that enable access to the second peripheral device.

6. A system for sharing peripheral devices over a network as recited in claim 5, wherein the second peripheral device is selected from the group consisting of a scanner, a tape drive, a CD-R drive, a removable drive, and a hard drive.

7. A system for sharing peripheral devices over a network, comprising:
    a first computer having at least one peripheral device connected thereto; and
    a second computer being networked to the first computer, the second computer being configured to send a request to use the at least one peripheral device over the network, the request being processed to determine whether the second computer has sharing privileges to the at least one peripheral device, the first computer being configured to grant access to the request of the second computer if the second computer has the sharing privileges that enable access to the at least one peripheral device, and the second computer communicating commands over the network to control the at least one peripheral device connected to the first computer.

8. A system for sharing peripheral devices over a network as recited in claim 7, wherein the first computer acts as a Server and the second computer acts as a Client.

9. A system for sharing peripheral devices over a network as recited in claim 8, wherein the first computer is configured to allow a user to set the sharing privileges for the at least one peripheral device.

10. A system for sharing peripheral devices over a network as recited in claim 9, wherein when the second computer is connected to the first computer and the second computer has sharing privileges to share the at least one peripheral device, the second computer can use the at least one peripheral device as if the at least one peripheral device were connected to the second computer.

11. A system for sharing peripheral devices over a network as recited in claim 10, wherein if the second computer is connected to the first computer and the second computer does not use the at least one peripheral device for a time-out period, the second computer is disconnected from the first computer.

12. A system for sharing peripheral devices over a network as recited in claim 11, wherein the second computer is disconnected after the time-out period only if another computer is waiting in a wait queue.

13. A system for sharing peripheral devices over a network as recited in claim 12, wherein when the second computer is disconnected after the time-out period, the second computer will send a message to the another computer informing the another computer that access to the at least one peripheral device is now allowed.

14. A system for sharing peripheral devices over a network as recited in claim 8, wherein the second computer acts as a first Client and the network includes a third computer that acts as a second Client, and the system further comprises:

a wait queue for storing a use request from the third computer when the at least one peripheral device is in use.

15. A system for sharing peripheral devices over a network as recited in claim 14, wherein when the use request from the third computer is stored in the wait queue, the first computer is configured to notify the third computer when the at least one peripheral device is no longer in use.

16. A system for sharing peripheral devices over a network as recited in claim 8, wherein the at least one peripheral device is a SCSI device.

17. A system for sharing peripheral devices over a network as recited in claim 16, wherein the at least one peripheral device is selected from the group consisting of a scanner, a tape drive, a CD-R drive, a removable drive, and a hard drive.

18. A system for sharing peripheral devices over a network as recited in claim 7, wherein the commands communicated over the network by the second computer to control the at least one peripheral device that is connected to the first computer are SCSI commands.

19. A system for sharing peripheral devices over a network as recited in claim 7, wherein the system further comprises:

a third computer that is networked to the first computer and the second computer, and a SCSI peripheral device connected to the third computer; and wherein the third computer acts as a Server that can grant use privileges to use the SCSI peripheral device, and the first computer acts as a first Client and the second computer acts as a second Client that can gain access to the SCSI peripheral device.

20. A method for sharing peripheral devices over a network, the network having a first computer that has a first host adapter and a first SCSI peripheral device connected to the first host adapter, comprising:

receiving a request to use the first SCSI peripheral device from a second computer that is connected to the network;

determining whether the second computer has access privileges to use the first SCSI peripheral device; and if the second computer has access privileges to use the first SCSI peripheral device, connecting the second computer to the first SCSI peripheral device so that the second computer can communicate commands to the first SCSI peripheral device.

21. A method for sharing peripheral devices over a network as recited in claim 20, further comprising:

determining whether a third computer is using the first SCSI peripheral device.

22. A method for sharing peripheral devices over a network as recited in claim 21, wherein when the third computer is using the first SCSI peripheral device, the request to use the first SCSI peripheral device is placed in a queue.

23. A method for sharing peripheral devices over a network as recited in claim 22, further comprising:

sending a message to the second computer from the first computer, the message being configured to inform a user of the second computer that the first SCSI peripheral device is available for use.

24. A method for sharing peripheral devices over a network as recited in claim 23, wherein the first computer responds as a server computer, and the second computer responds as a client computer.

25. A method for sharing peripheral devices over a network as recited in claim 24, wherein the third computer is configured to respond as a client computer, and the first computer is capable of sharing the first SCSI peripheral device with the second computer and the third computer.

26. A method for sharing peripheral devices over a network as recited in claim 25, wherein the first SCSI peripheral device is configured receive SCSI commands from either the second computer or the third computer.

27. A method for sharing peripheral devices over a network as recited in claim 20, wherein the first computer can set sharing privileges to the first host adapter.

28. A method for sharing peripheral devices over a network as recited in claim 27, wherein when the first computer denies sharing privileges to the first host adapter, a peripheral device that is connected to the first host adapter is not shared over the network with the second computer.

29. A method for sharing peripheral devices over a network as recited in claim 20, wherein the sharing of peripheral devices is configured from graphical user interfaces.

\* \* \* \* \*